United States Patent [19]
Fishler et al.

[11] Patent Number: 5,790,807
[45] Date of Patent: Aug. 4, 1998

[54] COMPUTER SYSEM DATA I/O BY REFERENCE AMONG CPUS AND I/O DEVICES

[75] Inventors: Leonard R. Fishler, Cupertino; Bahman Zargham, Sunnyvale, both of Calif.

[73] Assignee: Tandem Computers Incorporated, Cupertino, Calif.

[21] Appl. No.: 578,411

[22] Filed: Dec. 20, 1995

[51] Int. Cl.[6] .................. G06F 13/00; G06F 13/16; G06F 11/14

[52] U.S. Cl. .................. 395/200.46; 395/200.75; 395/132.14

[58] Field of Search .............. 395/200.08, 200.14, 395/182.06, 185.02, 182.14, 200.46, 200.41, 200.67, 200.75, 200.72

[56] References Cited

U.S. PATENT DOCUMENTS

| | | | |
|---|---|---|---|
| 4,214,305 | 7/1980 | Tokita et al. | 364/900 |
| 4,503,499 | 3/1985 | Mason et al. | 395/671 |
| 4,649,473 | 3/1987 | Hammer et al. | 364/200 |
| 4,674,033 | 6/1987 | Miller | 364/200 |
| 4,901,232 | 2/1990 | Harrington et al. | 395/826 |
| 4,956,771 | 9/1990 | Neustaedter | 364/200 |
| 5,278,834 | 1/1994 | Mazzola | 370/94.1 |
| 5,414,851 | 5/1995 | Brice, Jr. et al. | 395/650 |
| 5,475,836 | 12/1995 | Harris et al. | 395/600 |
| 5,557,798 | 9/1996 | Skeen et al. | 395/295 |
| 5,572,645 | 11/1996 | Dan et al. | 395/501 |
| 5,602,841 | 2/1997 | Lebizay et al. | 370/413 |
| 5,630,059 | 5/1997 | Brady et al. | 395/200.01 |

*Primary Examiner*—Mark H. Rinehart
*Attorney, Agent, or Firm*—Townsend and Townsend and Crew LLP; Larry Mendenhall

[57] ABSTRACT

An apparatus and method for getting descriptors to data and passing the descriptors among data sources and sinks, thereby avoiding copying the data among the data sources and sinks. The data source/sink which consumes the data actual initiates the copying of the actual data itself, using global pointers to the data in the descriptors.

18 Claims, 9 Drawing Sheets

COMPUTER SYSEM DATA I/O BY REFERENCE AMONG CPUS AND I/O DEVICES

BACKGROUND OF THE INVENTION

The present invention relates to data transfer in a computer system. In particular, the invention relates to methods and apparatus for transferring data among various sources and sinks for data.

RELATED APPLICATIONS

The following applications cover related inventions:

U.S. patent application Ser. No. 08/575,533, entitled "COMPUTER SYSTEM DATA I/O BY REFERENCE AMONG MULTIPLE CPUS," filed Dec. 20, 1995, naming Fishler and Zargham as inventors, assigned to the Assignee of this invention, with Attorney Docket No. 010577-036500US/TA 342;

U.S. patent application Ser. No. 08/578,366, entitled "COMPUTER SYSTEM DATA I/O BY REFERENCE AMONG I/O DEVICES AND MULTIPLE MEMORY UNITS," filed Dec. 20, 1995, naming Fishler and Zargham as inventors, assigned to the Assignee of this invention, with Attorney Docket No. 010577-036700US/TA 343;

U.S. patent application Ser. No. 08/578,410, entitled "COMPUTER SYSTEM DATA I/O BY REFERENCE AMONG CPUS AND MULTIPLE MEMORY UNITS," filed Dec. 20, 1995, naming Fishler and Zargham as inventors, assigned to the Assignee of this invention, with Attorney Docket No. 010577-036900US/TA 345; and U.S. patent application Ser. No. 08/578,409, entitled "COMPUTER SYSTEM DATA I/O BY REFERENCE AMONG MULTIPLE DATA SOURCES AND SINKS," filed Dec. 20, 1995, naming Fishler and Zargham as inventors, assigned to the Assignee of this invention, with Attorney Docket No. 010577-037100US/TA 346.

Queued, message-based I/O ("QIO") in a system with shared memory is discussed fully in U.S. application Ser. No. 08/377,302, filed Jan. 23, 1995 and assigned as well to the Assignee of the instant application. U.S. Application Ser. No. 08/377,302 is incorporated herein by reference and is loosely summarized below.

FIG. 1 is a block diagram showing a fault-tolerant, parallel data processing system 100 incorporating a QIO shared memory system. FIG. 1 includes a node 102 and a workstation 104 that communicate over a Local Area Network (LAN) 105. The node 102 includes processors 106 and 108, connected by an interprocessor bus (IPB) 109. The IPB 109 is a redundant bus of a type known by persons of ordinary skill in the art. Although not shown in FIG. 1, the system 100 is a fault-tolerant, parallel computer system, where at least one processor checkpoints data from other processors in the system. In prior art, in such a system, memory is not shared in order to avoid the memory being a bottleneck or a common point of failure. Such a fault tolerant system is described generally in, for example, U.S. Pat. No. 4,817,091 to Katzman et al.

The processor 106 includes a CPU 110 and a memory 112 and is connected via a disk driver 132 and a disk controller 114 to a disk drive 116. The memory 112 includes a shared memory segment 124, including QIO queues 125, an application process 120 and a disk process 122. The application and disk processes 120, access the shared memory segment 124 through the QIO library routines 126. As is the nature of QIO, messages sent between the application process 120 and the disk process 122 using the shared memory segment 124 and the QIO library 126 are sent without duplication of data from process to process.

The processor 108 also includes a CPU 142 and a memory 144 and is connected via a LAN controller 140 to LAN 105. The memory 144 includes a shared memory segment 150, (including QIO queues 151), a TCP/IP process 146 and an NFS distributor process 148. The TCP/IP process 146 communicates through the shared memory segment 150 using the QIO library routines 152 with the NFS distributor process 148 and the software LAN driver 158. Again, communications using the QIO shared memory segment 150 do not involve copying data between processes.

The TCP/IP process 146 and the LAN 150 exchange data by means of the LAN driver 158 and a LAN controller 140.

The process 120 communicates over the IPB 109 with the TCP/IP process 146 using message systems (MS) 128 and 154 and file systems (FS) 130 and 156. Unlike QIO communications, communications using message systems and file systems do require data copying.

Thus, FIG. 1 shows a QIO shared memory system for communicating between processes located on a single processor. A shared memory queuing system increases the speed of operation of communication between processes on a single processor and, thus, increases the overall speed of the system. In addition, a shared memory queuing system frees programmers to implement both vertical modularity and horizontal modularity when defining processes. This increased vertical and horizontal modularity improves the ease of maintenance of processes while still allowing efficient transfer of data between processes on a single processor and between processes and drivers on a single processor.

FIG. 2 illustrates a computer system generally designated as 200. The computer system 200 contains nodes 210, 211, 212 and 213. The nodes 210, 211, 212 and 213 are interconnected by means of a network 220. The nodes 210, 211, 212 and 213 run a disk process 230, an application server process 231, an intermediate protocol process 232 and a TCP/IP and ATM driver 233, respectively.

The application server process 231 receives user requests for data and directs the transfer of that data to the user over the TNet 220. The data requested generally resides on disks accessible only via disk controllers such as the disk controller 240. In fact, access to the data on a disk controller is mediated by a particular disk process. Here, the disk process 230 on the node 210 mediates access to the disk controller 240. The disk process 230 is responsible for transferring data to and from the disk attached to the disk controller 240.

With regard to the system 200 of FIG. 2, assume that a multimedia application needs to obtain some large amount of data 260, say, an MPEG video clip, from a data disk. Assume that the application does not need to examine or transform any (or at least a majority) of the individual bytes of that MPEG video clip. The application seeks that data 260 because an end user somewhere on the net has requested that video clip. A user interface and the application server process 231 communicate using an intermediate protocol implemented on TCP/IP. (The user interface which may be an application process or may be a hardware device with minimal software. In any event, the user interface is not shown here.) Accordingly, the intermediate protocol information 262 must be added to messages from the application server process 231, and the intermediate protocol process 232 has the responsibility for attaching such header information 262 as the intermediate protocol requires. Likewise, TCP/IP protocol information 263 must then be layered onto the outbound message, and the TCP/IP driver process 233 in the node 213 supplies such TCP/IP headers 263 as the TCP/IP protocol requires. Therefore, to transfer the data 260 on demand from the disk attached to disk controller 240, the application server process 231 employs the disk process 230 to retrieve the data 260 from disk and employs the intermediate protocol and TCP/IP & ATM driver processes 232, 233 to forward the data 260 to the user interface.

Further assume that among its functions, the application process 231 attaches some application-specific data 261 at the beginning of the outgoing data 260.

When the application server process 231 recognizes that the disk process 230 mediates access to the data 260 for the requesting user's consumption, the application server process 231 communicates a message to the disk process 230 via the TNet 220 in order to retrieve that data 260.

The disk process 230 builds a command sequence which the disk controller 240 on receipt will interpret as instructions to recover the data of interest. The disk process 230 directs the disk controller 240 to transfer the data 260 into the memory 250 of the sub-processing system 210. The disk controller 240 informs the disk process 230 on successful completion of the directed data transfer.

The disk process 230 in turn responds to the application server process 231 that the data transfer has completed successfully and includes a copy of the data 260 in its response. Thus, the requested data 260 is copied into the application server node 211. As one of ordinary skill in the art will appreciate, several copies may be necessary in order to transfer the data 260 from the TNet driver buffers (not shown) of the application server node 211 into the memory space of the application server process 231. Yet another copy is typically necessary to make the application-specific data 261 contiguous with the disk data 260. The QIO system related above, however, may obviate a number of these intra-processor copies but obviates none of the interprocessor copies.

Indeed, the combined data 261, 260 migrates by means of another interprocessor copy from the node 211 to the node 212. The node 212 adds its intermediate protocol header data 262, probably by copies of the data 262, 261 and 260 into a single buffer within the memory of the intermediate protocol process 232.

Again, the combined data 262, 261, 260 migrates from the node 212 to the node 213 by means of another interprocessor copy. The TCP/IP process 233 desires to divide the combined data 262, 261, 260 into TCP/IP packet sizes and insert TCP/IP headers 263a, 263b, . . . , 263n at the appropriate points. Accordingly, the TCP/IP process 233 copies all or at least substantially all of the combined data 262, 261, 260 and TCP/IP header data 263a, 263b, . . . , 263n to fracture and reconstruct the data in the correct order in the memory 253. The TCP/IP protocol process 233 then transfers these packets to the ATM controller 270 which sends them out on the wire.

(A system designer may wish to separate the processing of layered protocols into separate sub-processing systems for reasons of parallelism, to increase the throughput of the system 200. Such subprocessing systems do not share memory in systems of this type in order to achieve greater fault tolerance and to avoid memory bottlenecks.)

A computer system of this art requires that the disk data 260 be copied five times among the sub-processing systems —and typically an additional 2–4 times within each sub-processing system not practicing QIO as related above. The computer system 200 consumes memory bandwidth at (a minimum of) five times the rate of a system wherein interprocessor copying was not performed. The copying presents a potential bottleneck in the operation of the system 200, wasting I/O bandwidth, memory bandwidth and causing cache misses in the target CPU, all reducing performance.

Accordingly, there is a need for a system which avoids interprocessor copying of data, while avoiding shared memory bottlenecks and fault tolerance problems.

Accordingly, a goal of this invention is a computer system which obviates unnecessary copying of data, both intraprocessor and interprocessor.

This and other goals of the invention will be readily apparent to one of ordinary skill in the art on reading the background above and the description below.

SUMMARY OF THE INVENTION

In one embodiment, the invention a data processing system having a distributed memory architecture that includes a plurality of data sources/sinks in the form of CPUs or I/O controllers having associated memories, coupled as nodes to a network and with data accessible over the network, for getting a descriptor to a data buffer on a first of said plurality of data sources/sinks; putting said descriptor onto a second of said plurality of data sources/sinks without transferring the data in said data buffer; putting said descriptor from said second data source/sink onto a third of said plurality of data sources/sinks; and retrieving a portion of the data in said data buffer from said first data source/sink to said third data source/sink.

DESCRIPTION OF THE PREFERRED EMBODIMENT

Overview

Figure 1:
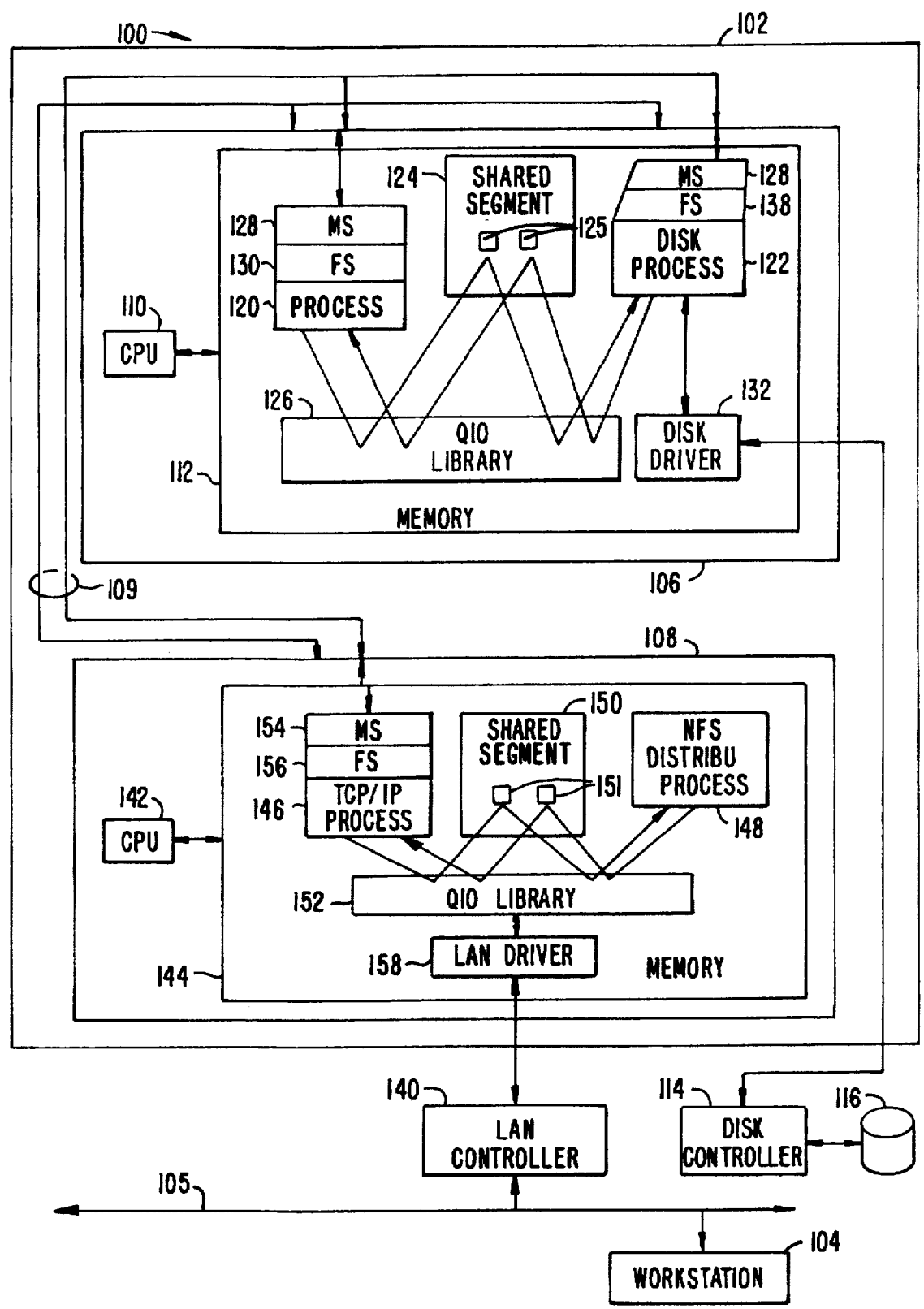
FIG. 1 is a block diagram showing a fault tolerant, parallel data processing system incorporating a QIO shared memory system.
Figure 2:
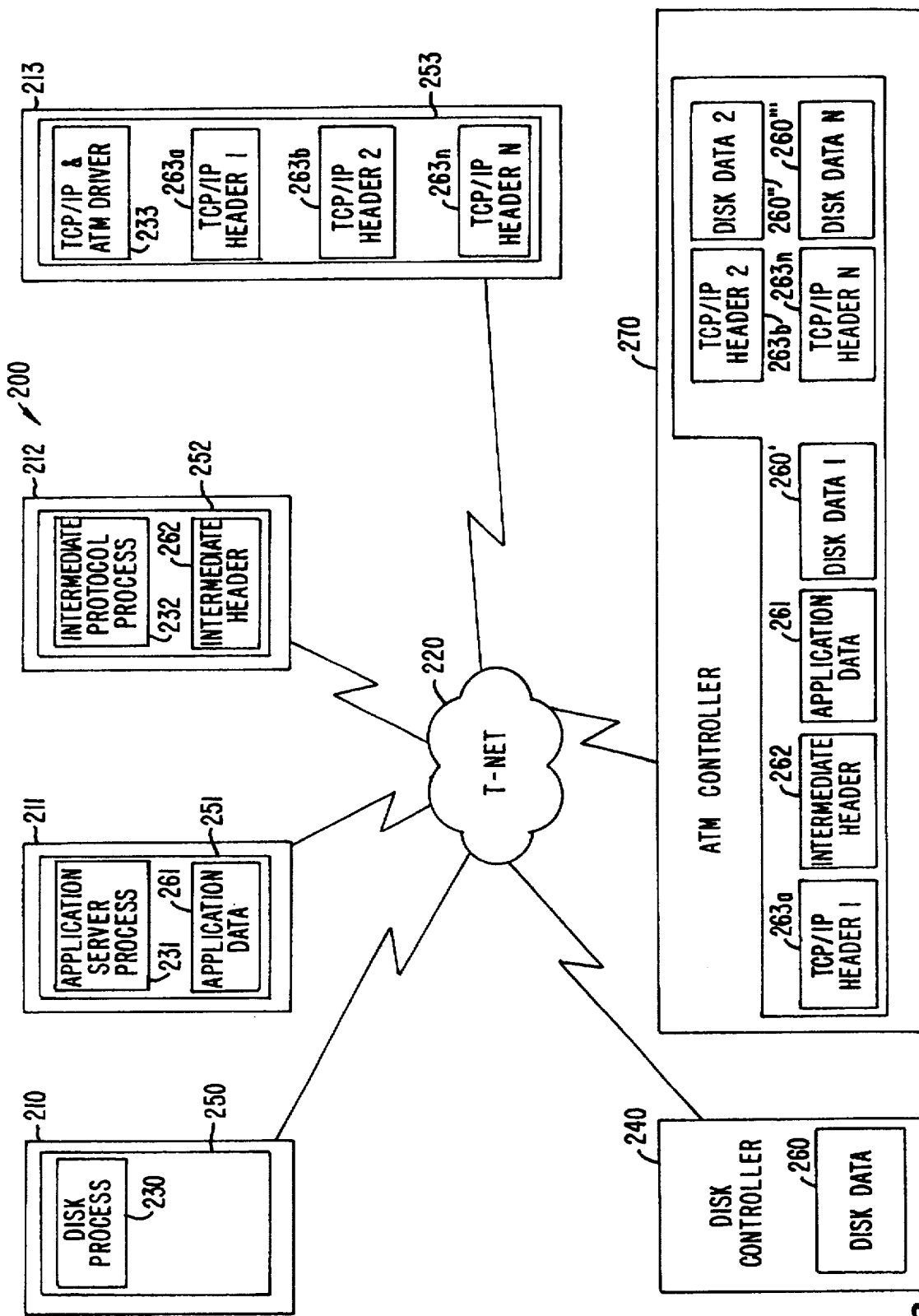
FIG. 2 illustrates a modular networked multiprocessor system.
Figure 3A:
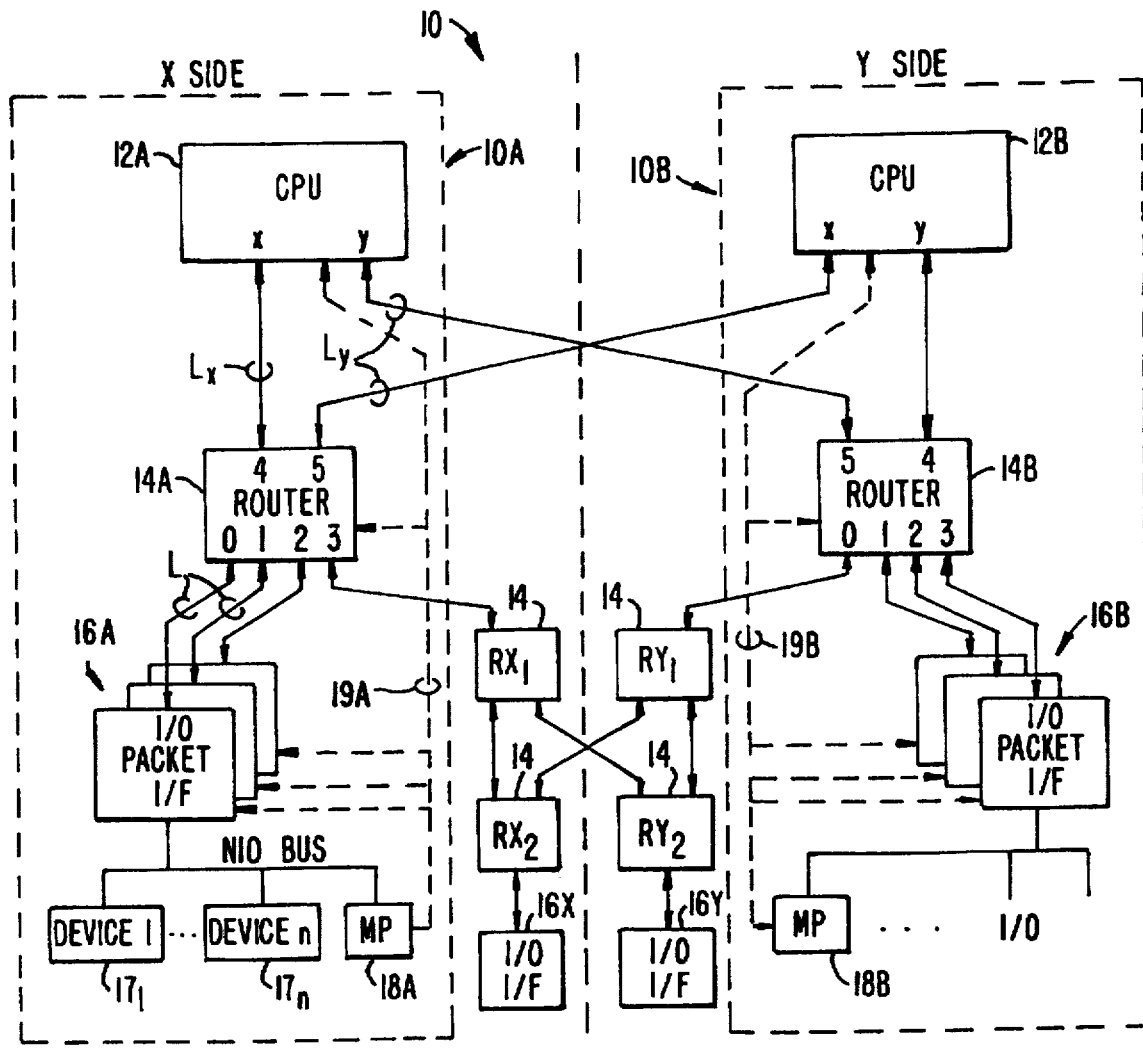
FIG. 3A illustrates a fault tolerant multiprocessor system.

FIG. 3A illustrates a data processing system 10, constructed according to the teachings of U.S. patent application Ser. No. 08/485,217, filed Jun. 7, 1995 (Attorney Docket No. 010577-028210) and assigned as well to the Assignee of the instant invention. (U.S. patent application Ser. No. 08/485, 217 is incorporated herein by reference and loosely summarized herein.) As FIG. 3A shows, the data processing system 10 comprises two sub-processing systems 10A and 10B, each of which are identically structured to the other. Each of the sub-processor systems 10 includes a central processing unit (CPU) 12, a router 14, and a plurality of input/output (I/O) packet interfaces 16. Each of the I/O packet interfaces 16, in turn, is coupled to a number (n) of I/O devices 17 and a maintenance processor (MP) 18.

Interconnecting the CPU 12, the router 14, and the I/O packet interfaces 16, are trusted network (TNet) links L. As FIG. 3A further illustrates, TNet links L also interconnect the sub-processing systems 10A and 10B, providing each sub-processing system 10 with access to the I/O devices of the other as well as inter-CPU communication. Any CPU 12 of the processing system 10 can be given access to the memory of any other CPU 12, although such access must be validated.

Figure 3B:
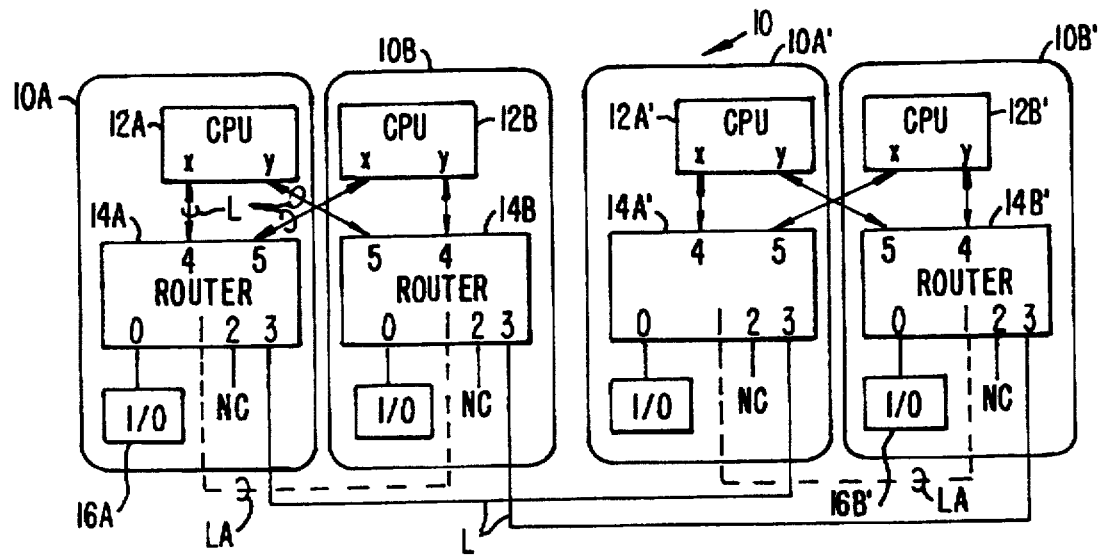
FIG. 3B illustrates an alternative configuration of the system of FIG. 3A.

Preferably, the sub-processing systems 10A/10B are paired as illustrated in FIG. 3A (and FIG. 3B discussed below).

Information is communicated between any element of the processing system 10 and any other element (e.g., CPU 12A of sub-processing system 10A) of the system and any other element of the system (e.g., an I/O device associated with an I/O packet interface 16B of sub-processing system 10B) via message "packets." Each packet is made up of symbols which may contain data or a command.

Each router 14 is provided with TNet ports, each of which is substantially identically structured (except in ways not important to this invention). In FIG. 3B, one port of each of the routers 14A and 14B is used to connect the corresponding sub-processing systems 10A and 10B to additional sub-processing systems 10A' and 10B' to form a processing system 10 comprising a cluster of sub-processing systems 10.

Due to the design of the routers 14, the method used to route message packets, and the judicious use of the routers 14 when configuring the topology of the system 10, any CPU 12 of processing system 10 of FIG. 3A can access any other "end unit" (e.g., a CPU or and I/O device) of any of the other sub-processing systems. For example, the CPU 12B of the sub-processing system 10B can access the I/O 16" of sub-processing system 10A"; or CPU 12A of sub-processing system 10A' may access memory contained in the CPU 12B of sub-processing 12B to read or write data. This latter activity requires that CPU 12A (sub-processing 10A') have authorization to perform the desired access. In this regard each CPU 12 maintains a table containing entries for each element having authorization to access that CPU's memory, and the type of access permitted.

Figures 1, 4:
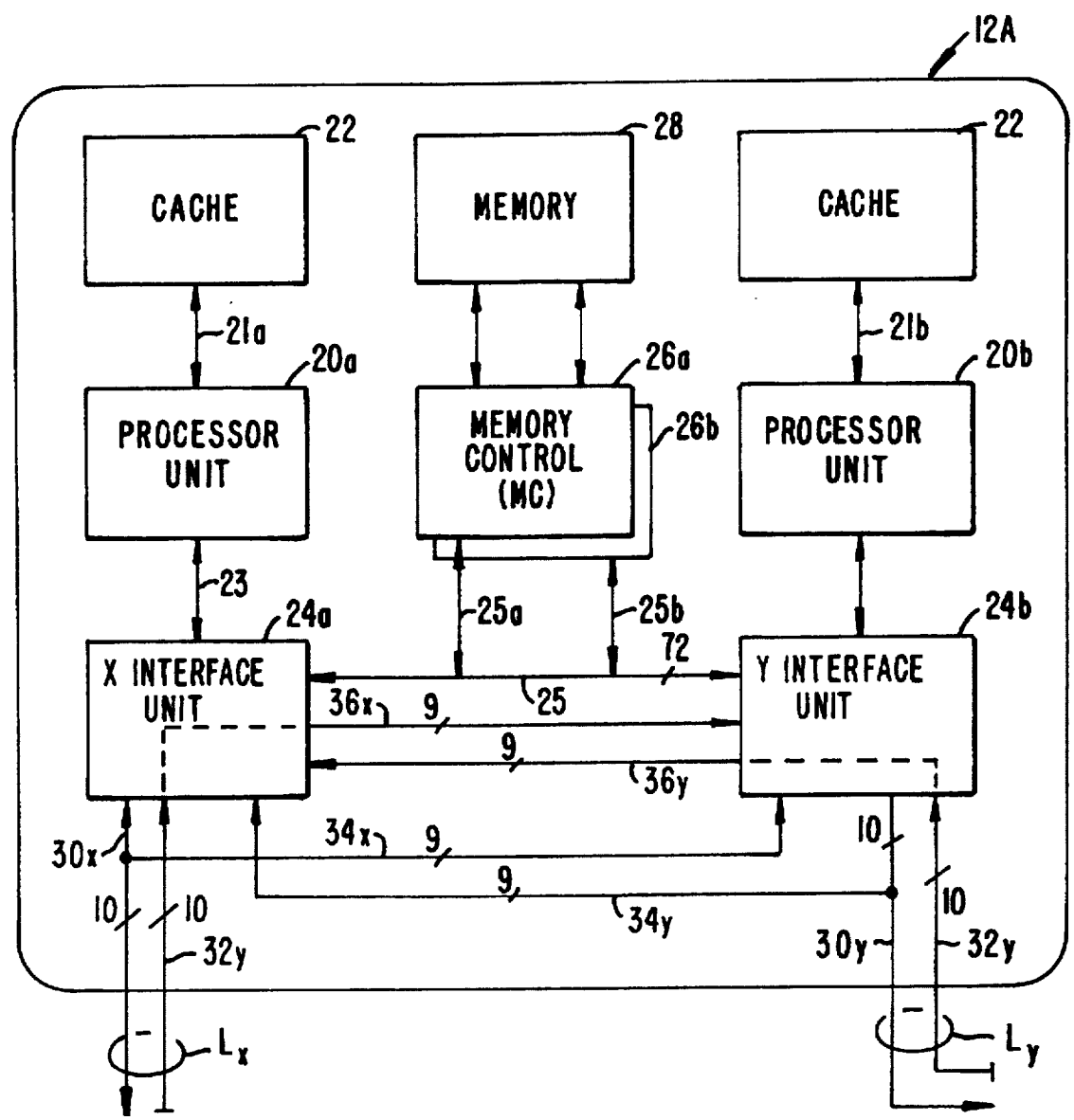
FIG. 4 illustrates the interface unit that forms a part of the CPUs of FIG. 3A to interface the processor and memory with the network.
Figures 2, 4:
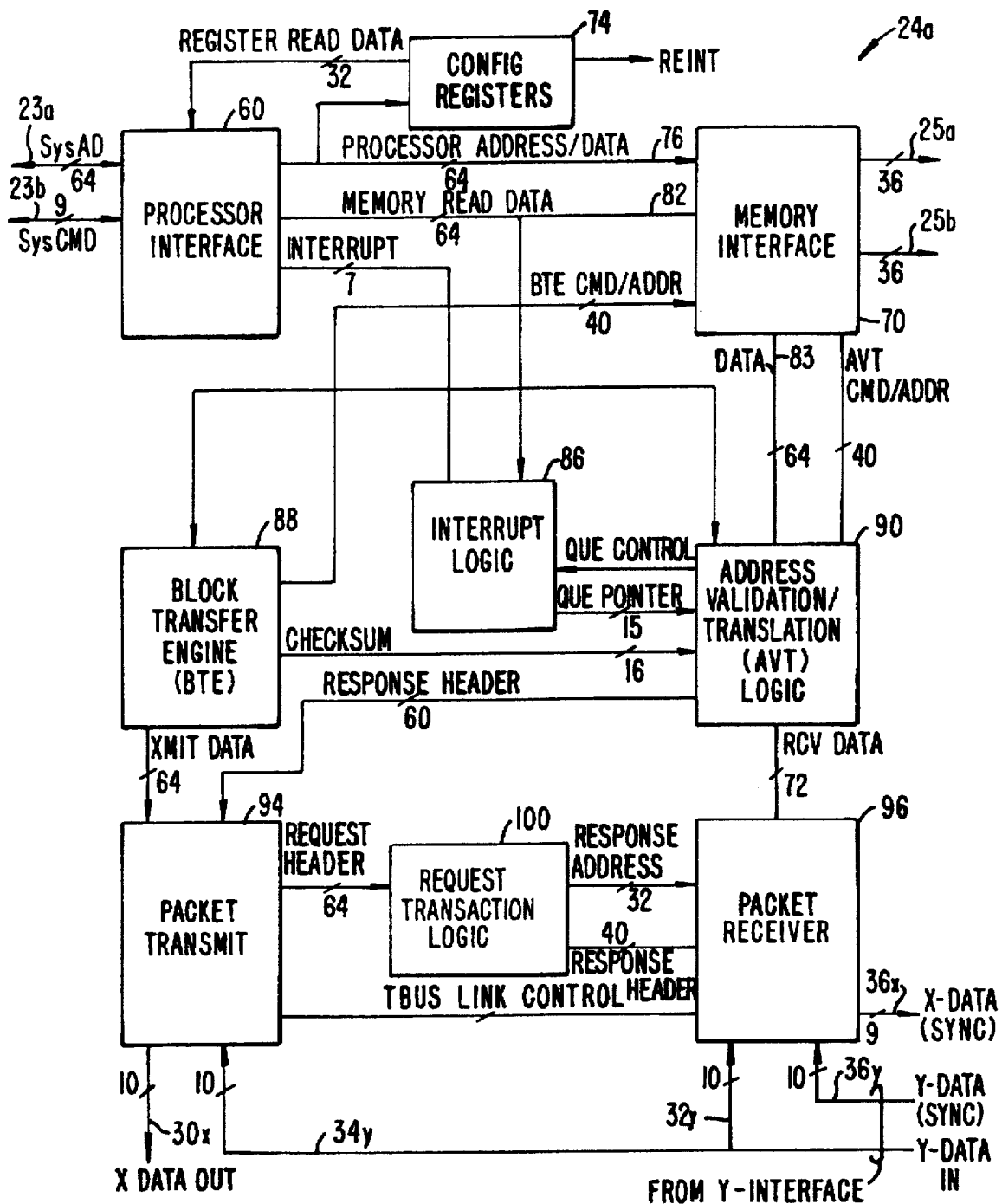

Data and commands are communicated between the various CPUs 12 and I/O packet interfaces 16 by packets comprising data and command symbols. A CPU 12 is precluded from communicating directly with any outside entity (e.g., another CPU 12 or an I/O device via the I/O packet interface 16). Rather, the CPU 12 will construct a data structure in the memory 28, turning over control to an interface unit 24 (see FIG. 4), which contains a block transfer engine (BTE) configured to have direct memory access (DMA) capability capable of accessing the data structure(s) from memory and of transmitting the data structure(s) to the appropriate destination.

The design of the processing system 10 permits a memory 28 of a CPU to be read or written by outside sources (e.g., CPU 12B or an I/O device). For this reason, care must be taken to ensure that external use of a memory 28 of a CPU 12 is authorized.

Figure 5:
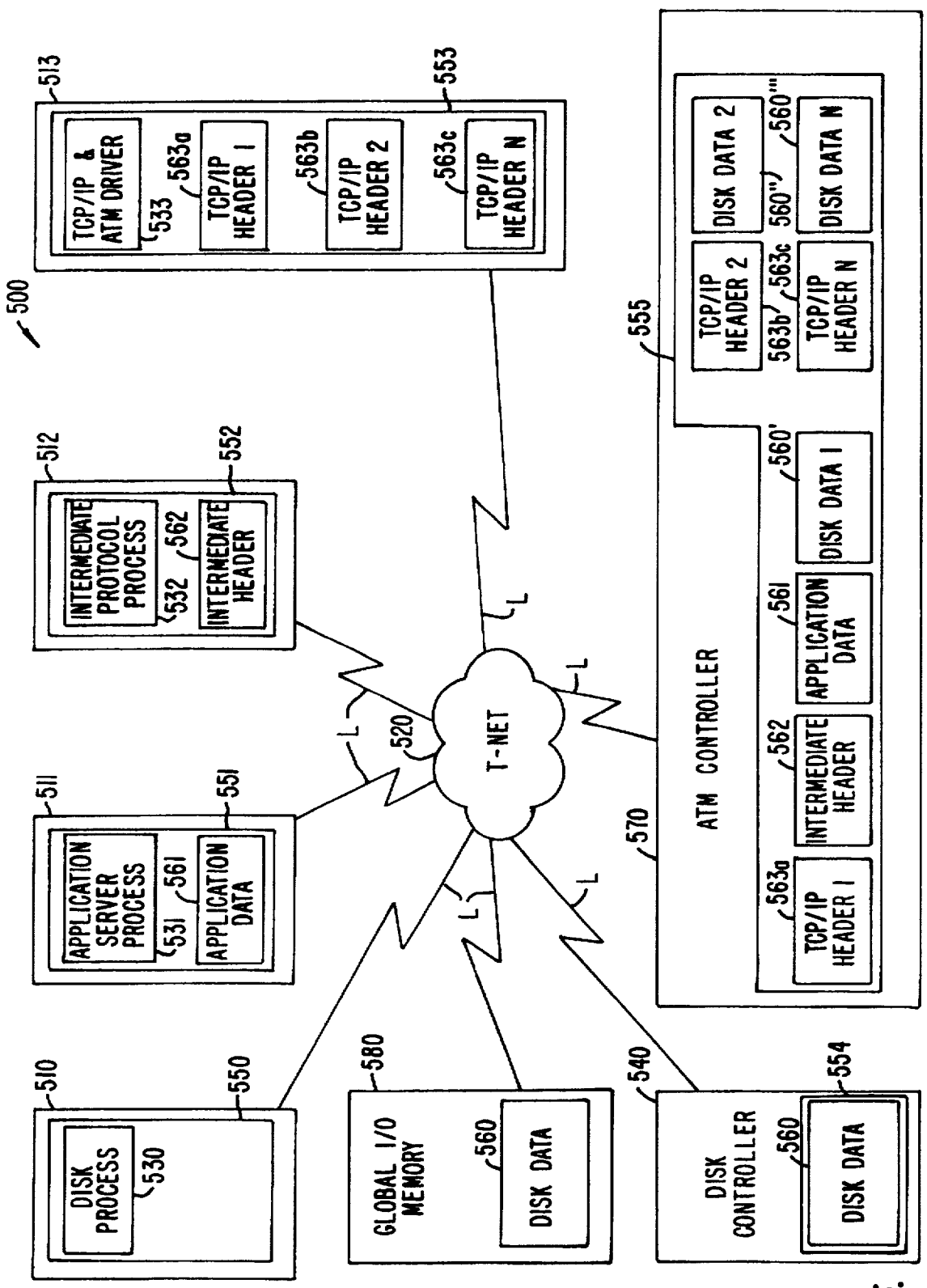
FIG. 5 illustrates a more particularized version of the computer system 100 of FIG. 3A.

Movie-on-Demand Scenario FIG. 5 illustrates a more particularized version of the computer system 100 of FIG. 3A. In FIG. 5, there is a computer system 500 which contains sub-processing systems 510, 511, 512 and 513. In the simplified schematic of FIG. 5, each of these sub-processing systems 510, 511, 512 and 513 may actually include paired sub-processing systems, as discussed. Although not illustrated in FIG. 5, each of the sub-processing systems 510, 511, 512 and 513 includes a respective router 14 and interface unit 24, as discussed above. FIG. 5 represents the TNet links L interconnecting the sub-processing systems 510, 511, 512 and 513 as links L from a TNet network 520.

The sub-processing systems 510, 511, 512 and 513 run a disk process 530, an application server process 531, an intermediate protocol process 532 and a TCP/IP and ATM driver 533, respectively. Again as discussed above, in a typical system, some of the processes 530, 531, 532 and 533 will have a backup process running in a paired sub-processing system. The simplified FIG. 5 illustrates these paired processes by their respective primary processes.

In the movie-on-demand example scenario described generally herein, the application server process 531 receives user requests for data (e.g., clips of movies) and directs the transfer of that data to the user over the TNet 520. The data requested generally resides on disks accessible only via disk controllers such as the disk controller 540. In fact, access to the data on a disk controller is mediated by a particular disk process. Here, the disk process 530 on the sub-processing system 510 mediates access to the disk controller 540. The disk process 510 is responsible for transferring data to and from the disk attached to the disk controller 540. (As system 500 is a fully fault-tolerant system, disk controller 540 has a pair and the disk of disk controller 540 is typically mirrored. Again, the fault-tolerant aspects of the system 500 are not illustrated in the simplified FIG. 5.)

Assume that the user interface and the application server process 531 are communicating using the RPC protocol implemented on TCP/IP. (The user interface may be an application process or may be a hardware device with minimal software. In any event, the user interface is not shown here.) Accordingly, RPC protocol information 562 must be added to messages from the application server process 531, and the intermediate protocol process 532 has the responsibility for attaching such header information 562 as the RPC protocol requires. Likewise, TCP/IP protocol information 563 must then be layered onto the outbound message, and the TCP/IP driver process 533 in the sub-processing system 513 provides such TCP/IP headers 563 as the TCP/IP protocol requires. Therefore, to transfer data on demand from the disk attached to disk controller 540, the application server process 531 employs the disk process 530 to retrieve the data from disk and employs the intermediate and TCP/IP & ATM driver processes 532, 533 to forward the data to the user interface.

Further assume that among its functions, the application process 531 attaches, at the beginning of the outgoing data, some application-specific data 561. This introductory data can be, for example, movie trailers, the familiar copyright notices, or command sequences to a video box connected to a television monitor.

When the application server process 531 recognizes that the disk process 530 mediates access to the data 560 for the requesting user's consumption, the application server process 531 communicates a message to the disk process 530 via the TNet 520 in order to retrieve that data 560.

The disk process 530 builds a command sequence which the disk controller 540 on receipt will interpret as instructions to recover the data of interest. However, rather than automatically directing the disk controller to transfer the data 560 into the memory 550 of the sub-processing system 510 or even into the memory 551 of the application server sub-processing system 511, the instruction sequence will direct the disk controller 540 to transfer the data 560 from the disk platter into a data sink.

Data Sinks and Sources

A data sink/source ("DSS") can be any device or portion of a device capable of storing and forwarding data on demand. The immediate advantage to moving the data 560 from the disk platter to a DSS is that the access time of the DSS will almost certainly be superior to the access time for retrieving data from the disk platter.

The DSS can be any of a number of options; the memory 554 that may be contained within the disk controller 540 itself, or any of the memories 550, 551, 552 or 553 of the sub-processing systems 510, 511, 512 or 513, respectively. The data sink may also be the memory 555 of the ATM controller 570, provided that the ATM controller 570 has a memory.

Another option is a novel type of DSS, herein termed "global memory." Global memory is a DSS available to all communicating devices on the TNet (if the device has sufficient privileges, as described in U.S. patent application Ser. No. 08/485,217). FIG. 5 illustrates the I/O global memory with global memory 580. The memory 580 is global in the sense that there is no software process which mediates access to the memory 580, there is no processor to which the memory 580 is attached as its primary memory, and there is no primary memory (such as the disk platter associated with the disk controller 540) to which the memory 580 is secondary.

The choice of DSS depends on the particular application. Design trade-offs may dictate a specific sink, a class of sinks, or some other subgroup of sinks. A major advantage to placing the data 560 in the global memory 580 rather than in the memory 554 of the disk controller 540 is that the additional memory or memory bandwidth which the global memory 580 provides is more economical than an equivalent, additional disk controller. Likewise, the additional memory or memory bandwidth of the global memory 580 is clearly more economical than an equivalent, additional paired sub-processing system (the "SPS") such as SPS 510. Global memories such as the global memory 580 allow the system designer to scale memory capacity and bandwidth independently of scaling the disk controllers and the sub-processors. They also allow the system designer to avoid the negative impact on performance on the SPS that passing the data into its memory has. The negative impact is due to the memory cache invalidation and flushing involved in passing the data into the SPS memory.

An issue arises when the destination of the data 560 may not be within the control of the original requestor of the data (here, application server process 531) or even the ultimate requestor of the data (here, disk process 530). That issue is: Who determines the destination of the data 560?

A number of options are available. In a first option, the disk process 530 decides which of the available global memories (e.g., the global memory 580) in the system 500 is to be the destination and arranges for space for the data 560. Another option is for the application server process 530 to decide which of the available global memories in which to place the data 560 but to leave for the disk process 530 the actual allocation of space. In this scenario, the application server process 531 communicates to the disk process 530 the identity of the chosen DSS and indicates that the allocation has not been performed.

As a final option, the application server process 531 both decides which of the available data sinks is to be the destination and performs that allocation as well. It then becomes incumbent upon the application server process 531 to perform the allocation and to pass that allocation information by means of a global pointer as described below on to the disk process 530. The disk process 530 then knows that it need not choose a destination for the requested data and that it may incorporate the pre-allocated destination into its disk command sequence.

A clear implication of the above is that a global memory such as the global memory 580 must have sufficient intelligence to manage its memory or must be under the control of a process which manages its memory for it. This latter scenario is analogous to the disk process 530 managing the memory of the disk platter attached to the disk controller 540. The former is analogous to a sub-processing system (e.g., sub-processing system 510) managing its own memory (e.g., memory 550) and is preferred.

An advantage may lie in allowing an application process such as application server process 531 to determine which global memory DSS to use. The application process might have a better understanding of what its memory requirements are over time. The application process might, for example, seek to manage some subset of the pool of global memories, keeping certain data in them as, in effect, data caches. The video-on-demand movie application server process 531 could treat the global memory available in the system as a large cache spread across a number of hardware devices. Indeed, a cross-over point may be reached where keeping a high-demand video in global memory is more economical than keeping that movie on disk.

Data I/O by Reference

On receipt of the disk command sequence directing the transfer of the data 560 on the disk platter, the disk controller 540 transfers the data 560 from the disk platter into the DSS destination chosen and allocated between the application process 531 and the disk process 530. Here, assume that the chosen data sink is the global memory 580. The global memory 580 (or the disk controller 540) then informs the disk process 530 that the directed data transfer has completed successfully. The disk process 530 in turn informs the application server process 531 that the requested data has been placed in the global memory 580. Where the disk process 530 allocated the actual destination of the data 560, the disk process 530 also communicates to the application server process 531, by means of a global pointer described below, the address of the data 560 on the TNet 520.

Now, with the a global pointer to the data 560 and with its own application-specific data 561 in memory 551, the application server process 531 would typically copy and concatenate the two pieces of data 561, 560 into a single buffer and copy-forward that data on to the intermediate protocol process 532. However, according to the invention, the application server process 531 instead passes the global pointer to the data 560 and another global pointer to its application-specific data 562 on to the intermediate protocol process 532. In effect, application server process 531 creates a logically (i.e., virtually) contiguous block of memory by chaining together global pointers to physically non-contiguous blocks of data 561, 560. (Indeed, the data 561, 560 are so physically non-contiguous as to be located in physically separate DSS's.) The application server process 531 then passes the chain of pointers on to the intermediate protocol process 532.

The intermediate protocol process 532 in turn forgoes copying the data 561, 560 into its own associated memory 552. The process 532 instead passes the two global pointers to the data 561, 560 on to the TCP/IP process 533, along with a third global pointer to the intermediate protocol header data 562. The intermediate protocol process 532 thereby avoids the trans-network and inter-processor copying necessary to retrieve the data 561, 560. The process 532 also avoids the intra-processor copying necessary to move the data from the network driver buffers into the operating system of the sub-processing system 510 on into the memory space of the intermediate protocol process 532.

TCP/IP protocol processing requires the division of the logically contiguous data into packet-sized chunks for transmission, each packet preceded by its own TCP/IP header. The TCP/IP process 533 processes the chain of TNet pointers. Walking the chain, it creates a TCP/IP header 563a for the first packet-sized chunk of data in the logically contiguous data 562, 561, 560, a TCP/IP header 563b for the second chunk in the data 562, 561, 560 and so on until the last N-th TCP/IP header 563n for the last chunk of the data 562, 561, 560.

Because these TCP/IP headers must be inserted among the data 562, 561, 560, the TCP/IP process 533 must transform the global pointers to the data 562, 561, 560 into a series of pointers to data no larger than a TCP/IP packet. Each global pointer includes the identity of its DSS of origin, the address on the identified DSS of the data, and the size of the data located at that address. The transformations of the global pointers to the data 562, 561 560 into a series of packet-size data are described below. The TCP/IP process 533 can now pass on this new series of transformed global pointers to packets of the data 562, 561, 560, interspersing global pointers to the TCP/IP headers 563a, 563b, . . . , 563n.

Assume that the intermediate protocol data 562, the application-specific data 561 and some first portion 560' of the disk data 560 together total a first packet. Also assume that some second portion 560" of the disk data 560 composes a second packet. Finally, a last portion 560'" of the disk data 560 makes up the last packet of data to be transported. The TCP/IP process 533 passes on to the ATM controller 570, a chain of global pointers pointing to the following data: the TCP/IP header data 563a, the intermediate protocol header data 562, the application-specific data 561, the disk data 560', the TCP/IP header data 563b, the disk data 560", . . . , the TCP/IP header data 563n, and the disk data 560'".

At a time depending on the programming of the ATM controller 570 and the dynamic state of the system 500, the ATM controller 570 walks through the chain of global pointers received from the TCP/IP process 533 and fetches the actual data 563a, 562, 561, 560', 563b, 560", . . . , 563n and 560'" into its memory 555. The ATM controller fetches the TCP/IP header data 563a, 563b, . . . , 563n from the memory 553 of the TCP/IP protocol sub-processing system 513; the intermediate protocol header 562 from the memory 552 of the intermediate protocol sub-processing system 512; the application-specific data 561 from the memory 551 of the application server sub-processing system 511; and the disk data 560', 560", . . . , and 560'" from the global memory 580.

The ATM controller, with all of the required data in its physical memory, transmits the data.

It will be noted that there was only one copying of each of the application data 561, the intermediate protocol header data 562 and the TCP/IP protocol header data 563. The disk data was copied twice, although the copying of the data 560 from the disk controller 540 to the global memory 580 was not strictly necessary. In the prior art, with the same hardware and data flow of the system 500, the application data 561 would have been copied at least three times, the intermediate protocol header data 562 would have been copied twice, and the disk data 560 would have been copied six times. In situations where the disk data 560 is large (as in the movie-on-demand environment described herein) or where the number of intermediate protocol sub-processing systems is large, the reduction in copying leads to significant savings. It allows the costs to approach that of a shared memory MPP system, without the problems such a system has with memory bottlenecks.

Data Structures

The data structures and protocols used in a preferred embodiment to achieve the data I/O by reference of the invention are described below.

First, in order to allow a reference or pointer to data in a data sink/source (DSS) to have meaning to a process on a device connected to the DSS only by a network, a schema for recognizing DSS-specific addresses across the network must be implemented. In the data I/O by reference schema described herein, these addresses are termed global addresses.

In one embodiment, global addresses are a combination of, one, an ID of a network DSS and, two, an address recognized by that DSS. The ID of a network DSS is unique among all devices functioning as DSS's in the network.

In the embodiment, the address recognized by a particular DSS is specific to the addressing scheme of that particular DSS. A DSS may maintain virtual or physical global addresses. For example, the disk controller 540 is very likely to maintain physical addresses to its memory 554. A sub-processing system can maintain addresses in virtual or real space, depending on whether the global addresses are allocated in the virtual address space of a process or in the real address space of the operating system-level global QIO driver. Maintaining the global addresses in the real address space of the QIO driver avoids hardware and software translation costs.

Global addresses are incorporated into global QIO data structures passed among networked devices. In one embodiment, the main global QIO data structures are a queue, a message, a message descriptor and a buffer descriptor.

Figure 6:
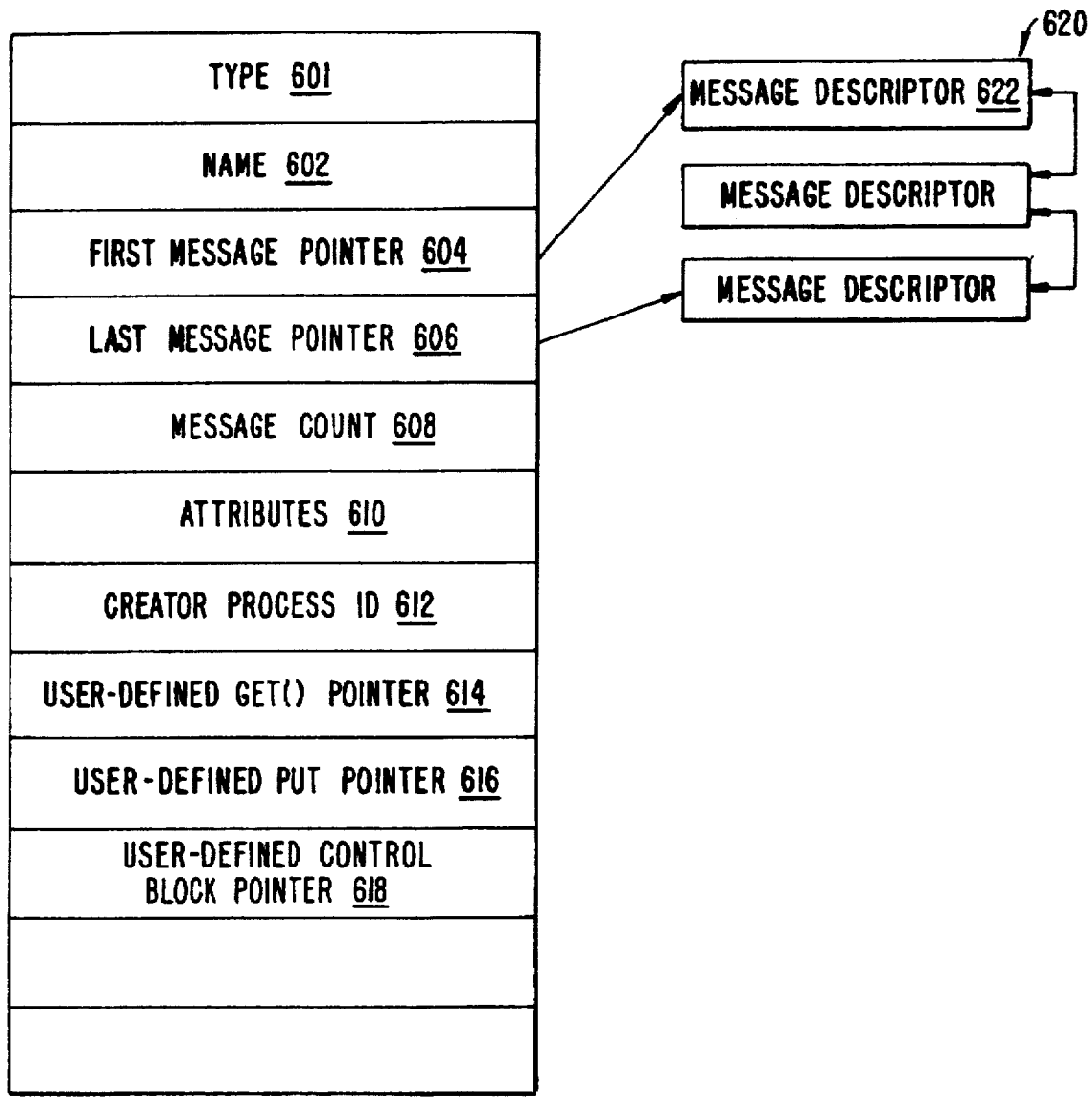
FIG. 6 is a representation of a global QIO queue.

FIG. 6 illustrates a global QIO queue 600 according to an embodiment of the invention. A queue 600 exists in the memory of each DSS on the network. A queue 600 includes a type 601, a human-readable queue name 602, a first message pointer 604, a last message pointer 606, a message count 608, queue attributes 610, a creator process ID 612, a pointer 614 to a user-defined GET( ) function, a pointer 616 to a user-defined PUT( ) function, and a pointer 618 to a user-defined control block.

The descriptor type 601 indicates that this data structure is a queue. The queue name 602 is a name of the queue, e.g., "GLOBAL QIO INBOUND." The first message pointer 604 points to a first message descriptor 622 of a first message in a doubly linked list of messages 620, and the last message 606 points to a first message descriptor 624 of a last message in the doubly linked list 620.

The message count 608 holds the number of messages in the doubly linked list 620. The queue attributes 610 include attributes of the queue, e.g., whether a process should be awakened when data is put onto its inbound queue and whether a user-defined GET( ) function is to be called before, after or instead of the global QIO library GET_MESSAGE( ) function. (Global QIO library functions are described below.) The creator process ID 612 is the ID of the process that created the queue. The global QIO library may awaken this process whenever a queue becomes non-empty.

The pointer 614 points to a user-defined GET( ) function performed whenever a process invokes the global QIO library GET_MESSAGE( ) function to get a message from the queue 600. The user-defined GET( ) function allows the user-defined function to be performed in addition to or instead of a standard GET function in the global QIO library. For example, if the queue 600 is an inbound queue for an I/O driver, a user-defined GET( ) function might initiate an I/O operation by the driver. The driver may also keep track of a number of outstanding I/Os and may adjust this number whenever a GET is performed. As another example, a GET( ) may cause a housekeeping routine to be performed by the process that created the queue.

The pointer 616 points to a user-defined PUT( ) function which is processed in a manner paralleling that of the pointer 614. For example, in a queue associated with a LAN driver, the PUT( ) function may invoke a transport layer routine to output information to TNet 520.

The pointer 618 points to a user-defined control block. Typically, this control block is needed by one or both of the user-defined PUT( ) and GET( ) functions. For example, the control block might be for a driver that outputs information when the information is sent to the queuing system.

Figure 7:
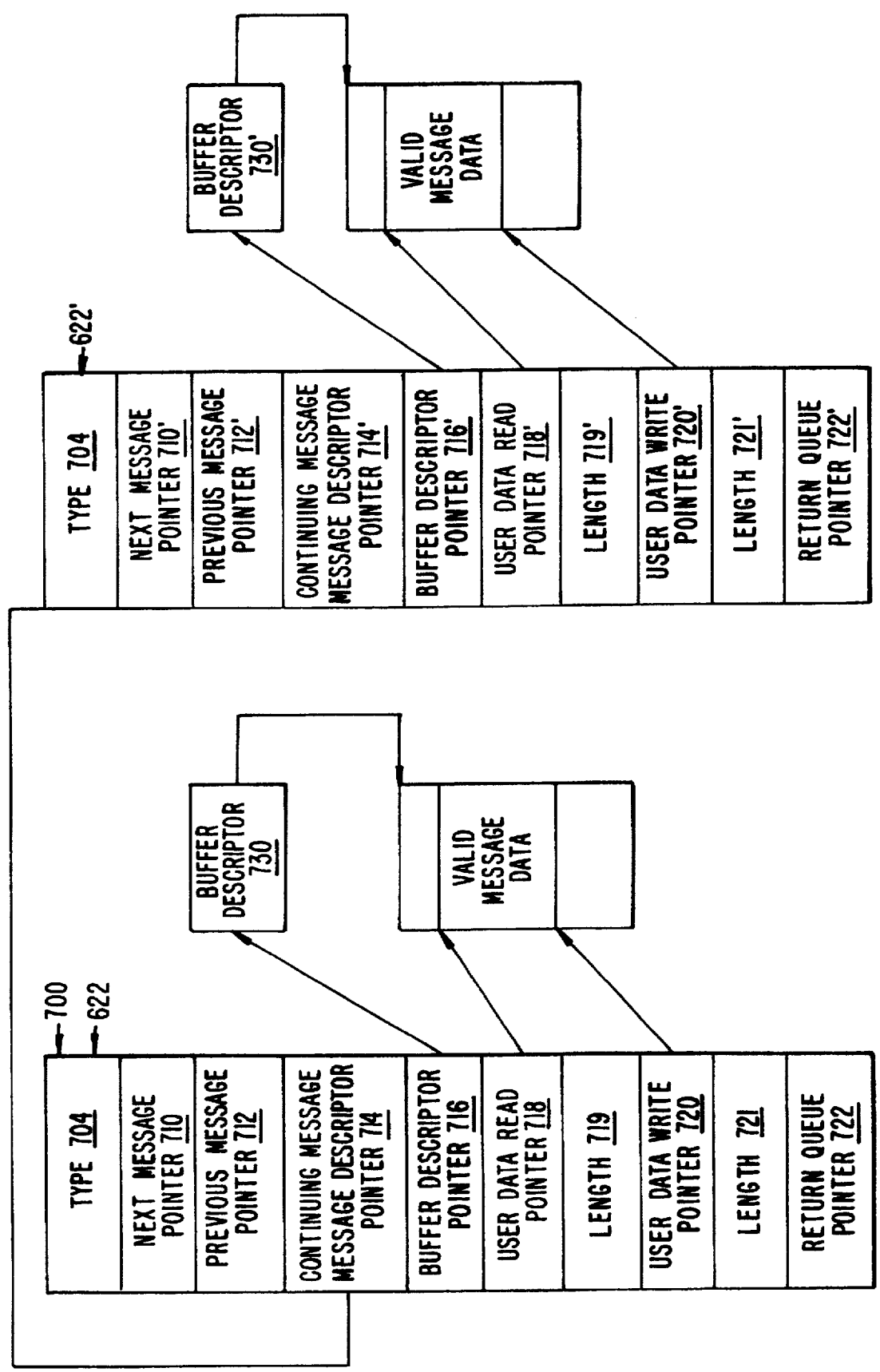
FIG. 7 shows a format of a message.

FIG. 7 shows a format of a message 700 stored in the doubly linked list 620 of FIG. 6. A message is made up of linked message descriptors and is linked into the list 620 of FIG. 6. FIG. 7 shows message descriptors 622 and 622', which are joined in a linked list by pointer 714 to form a message. A message descriptor includes a descriptor type 704, a next-message pointer 710, a previous-message pointer 712, a continuing-message message descriptor pointer 714, a buffer descriptor pointer 716, a user data read pointer 718, a user data write pointer 720, and a return queue pointer 722. A message descriptor also includes lengths 719, 721 associated with pointers 718, 720, respectively.

In FIG. 7, the message descriptors 622 and 622' form a single message. The descriptor type 704 indicates that the data structure is a message descriptor. The next-message pointer 710 points to the first message descriptor 624 of a next message stored in the doubly linked list 620. The previous-message pointer 712 points to the first message descriptor of a previous message stored in the doubly linked list 620. The continuing-message message descriptor pointer 714 points to the next message descriptor 622', in the current message 622. Multiple message descriptors are necessary to represent scattered data, and a single message can include multiple message descriptors pointing to data in different locations, as will be shown below. The buffer descriptor pointer 716 points to a buffer descriptor 730. The buffer descriptor 730 points to a data buffer 740.

A user data read pointer 718 is a pointer into the buffer 740 and indicates where in the data buffer 740 reading should commence (or has stopped). Similarly, a user data write pointer 720 is a pointer into the buffer 740 indicating where in the data buffer 740 writing should commence (or has stopped). The lengths 719, 721 respectively indicate the maximum amount of data which can be read from or written to read pointer 718 and write pointer 720.

A return queue pointer 722 points to a return queue (not shown). When a message descriptor is returned, via the global QIO library routines (i.e., when processing of the message is complete), the returned message descriptor is placed on the return queue if the return queue is specified. For example, a process may need to count messages sent. Instead of putting the message descriptor 622 into a free memory pool when it is removed from the queue 600, the message descriptor 622 is placed on the return queue for further processing by some process. Other message descriptors 622' in a message 700 may have different, secondary return queue pointers 722' or NULL return queue pointers. These secondary return queue pointers are processed by processes according to the application at hand. The return queue for a message descriptor is usually on the DSS which originally allocated the message descriptor for its current use.

Figure 8:
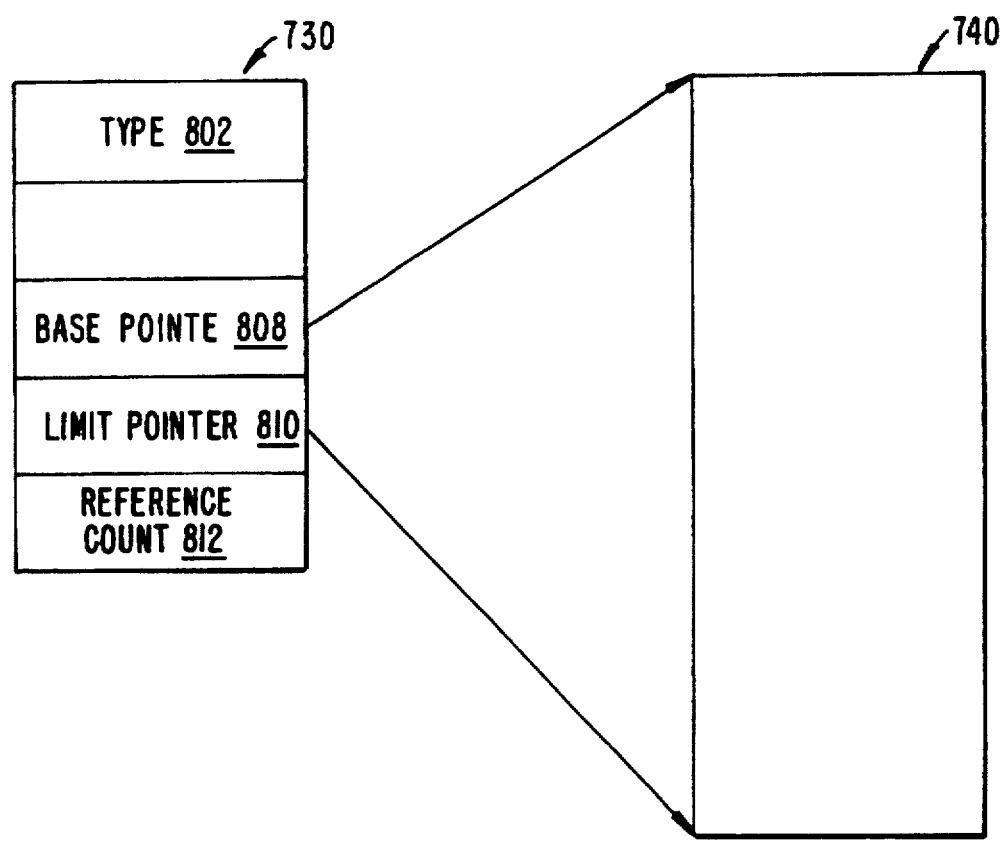
FIG. 8 shows a format of a buffer descriptor.

FIG. 8 shows a format of a buffer descriptor 730 according to an embodiment of the invention. The buffer descriptor 730 is a part of the message 722 of FIG. 7. A descriptor type 802 indicates that the data structure is a buffer descriptor. The buffer descriptor 730 includes a data buffer base pointer 808, a data buffer limit pointer 810, and a reference count 812. The data buffer base pointer 808 points to a base of a data buffer 740 in memory. The data buffer limit pointer 810 points to the end of the data buffer 740. The reference count 812 counts the number of buffer descriptor pointers 716 which point to the specific buffer descriptor 730.

A queue 600 is local to the DSS on which it is created. A queue 600 data structure is never communicated to another networked DSS. Accordingly, each of the pointers 604, 606, 612, 614, 616 and 618 are local addresses rather than global addresses.

Message descriptors 622, however, are passed among networked DSS's. Therefore, the buffer descriptor pointer 716 and the user data read and write pointers 718, 720 are global pointers interpreted by the DSS which generated them.

As will be appreciated by persons of skill in the art, certain fields of a message descriptor 622 can be omitted when the message descriptor 622 is communicated between networked devices. Such fields include, for example, the next—and previous-message pointers 710, 712; and the continued-message message descriptor pointer 714. The global QIO library on the receiving networked device can generate these fields on the allocation of message descriptors to put the message on a queue. A message descriptor without these fields is termed the global form of a message descriptor and the type 704 may be altered to reflect the omissions.

Conversely, the buffer descriptor pointer 716, the data read and write pointers 718, 720, the corresponding length fields 719, 721, the return queue pointer 722 and the checksum 724 are included in the global form of a message descriptor 622 as communicated between DSS's.

The buffer descriptor 730 is not communicated across the network. The data buffer base pointer 808 is irrelevant to reads or writes of the data buffer 740. Read and write pointers are supplied in the user data read and write pointers 718, 720 of a message descriptor 622. Similarly, the data buffer limit pointer 812 is irrelevant to reading and writing of the buffer across the network. According to the protocols described below, a well-behaved reading or writing process requests a data buffer 740 of a specified length, and the well-behaved allocator of that data buffer 740 guarantees that the user data read or write pointer 718 or 720 points to a segment of data buffer 740 which is at least the specified length. (Where the specified length is distributed across a chain of message descriptors, the well-behaved allocator guarantees that the chain of user data pointers point to segments of data buffers 740 which together are at least the specified length.)

Protocols

Message-Based Communications

Communication between any two components of the system 500 (e.g., between first and second SPS's, or between an SPS and a global memory) is implemented by forming and transmitting low-level messages which are included in packets. (Low-level messages are distinct from the messages of the global QIO system described herein.) These packets are routed from the transmitting or source component to a destination component by the system area network structure, the TNet 520.

The details of how the system components, the routers 14 and the interface units 24 (including the BTE DMA engines) cooperate to achieve this communication are explained fully in U.S. patent application Ser. No. 08/485,217. For this disclosure, it suffices to know that an HAC packet is used to transmit read requests and that an HADC packet is used to communicate write data.

GLOBAL QIO

The global QIO library includes the following software entry points, each of which is described further below:

- create a global QIO queue;
- delete a global QIO queue;
- get a message descriptor
- duplicate a message descriptor
- return a message
- duplicate a message
- get a message from a global QIO queue
- put a message onto a global QIO queue A process invokes the CREATE_QUEUE( ) procedure to register a named queue with the global QIO library, creating inbound and outbound queues. Accordingly, an invoking process passes the name of a port, and the CREATE_QUEUE( ) routine returns the queue ID's of the inbound and outbound queues for the port, and the module ID. Once the process successfully invokes the CREATE_QUEUE( ) routine, the process may subsequently invoke the PUT_MESSAGE( ) and GET_MESSAGE( ) routines described below.

Correspondingly, a process may invoke the DELETE_QUEUE( ) global QIO library routine. This function removes a registration from the global QIO library. A process passes the queue ID's of the inbound and outbound queues to be deregistered. After deregistration, a process can no longer send outbound messages or receive inbound messages via the identified queues.

The PUT_MESSAGE( ) routine puts a specified message onto a specified queue. Where the message and queue are on the same DSS, PUT_MESSAGE( ) operates much as described in Appendix A. Where the message and queue are not on the same DSS, the low-level message packet system is invoked to transfer a global form of the specified message from the DSS of the message to the DSS of the queue. The message is freed on the DSS of origin.

The GET_MESSAGE_DESCRIPTOR( ) entry point returns a pointer to a message descriptor which contains a data buffer pointer to a data buffer of (at least) a specified length. Accordingly, the GET_MESSAGE_DESCRIPTOR( ) entry point takes a module ID and a data buffer length as arguments and returns a pointer to a message descriptor. In effect, a DSS or process invoking GET_MESSAGE_DESCRIPTOR( ) requests the global QIO library to allocate a data buffer of the specified length, to allocate a buffer descriptor initialized to a point to the newly allocated data buffer and to allocate a message descriptor, initialized to point to the newly allocated buffer descriptor and to point to the write location within the data buffer.

(Where a data buffer currently in use has an unallocated portion sufficiently large to satisfy a subsequent GET_MESSAGE_DESCRIPTOR( ) request, that (unallocated portion of the) data buffer may be used to satisfy that possibly unrelated GET_MESSAGE_DESCRIPTOR( ) request.)

In a preferred embodiment, free message descriptors are maintained on a free message descriptor list. The management of such a free list is well known in the art.

The DUPLICATE_MESSAGE_DESCRIPTOR( ) routine returns a duplicate of a specified message descriptor. Accordingly, the DUPLICATE_MESSAGE_DESCRIPTOR( ) routine takes a module ID and a pointer to a message descriptor as arguments and returns a pointer to a message descriptor. The returned message descriptor points to the same buffer descriptor and data as the specified original message descriptor, and the reference count of that buffer descriptor increases by one by virtue of the duplication. The duplicate message descriptor comes from the free message descriptor list.

The reference count of the underlying buffer descriptor must be updated. This update can be accomplished by requesting the DSS which is the origin of the message descriptor to update the reference count or by putting the message descriptor back onto its DSS of origin and having that DSS duplicate the message descriptor, putting back the original and the duplicate.

The global QIO library contains a corresponding RETURN_MESSAGE_DESCRIPTOR( ) routine. This routine moves a message descriptor on the invoking DSS to the free list of message descriptors on the DSS which originally allocated the message descriptor for its current use. However, if the return queue pointer of the message descriptor is not NULL, the routine returns that message descriptor to the indicated return queue. The RETURN_MESSAGE_DESCRIPTOR( ) routine takes as arguments a module ID and a pointer to the message descriptor to be returned.

On the originating DSS, the reference count of the buffer descriptor decrements by one, since one less message descriptor points to that buffer descriptor. If the reference count reaches zero, the data buffer descriptor returns to the pool of free data buffers. (See the description of DATA_BUFFER_RETURN( ) below.)

The RETURN_MESSAGE( ) routine is a recursive version of the RETURN_MESSAGE_DESCRIPTOR routine. RETURN_MESSAGE walks the chain of message descriptors headed by the identified message descriptor, unlinking the head message descriptor from any continuing message descriptors (i.e., nulling out the continuing-message message descriptor pointer of the head message descriptor) and returning the head message descriptor to the appropriate return queue, until no more continuing-message message descriptors exist.

The DUPLICATE_MESSAGE( ) routine duplicates an entire message. DUPLICATE_MESSAGE takes as arguments a module ID and a pointer to the head message descriptor of the message and returns a pointer to the head message descriptor of the duplicate message structure. The entire message is duplicated (though not the data), starting at the head message descriptor of the original message and following through all the message descriptors chained by the continuing-message message descriptor pointers. The reference count of the buffer descriptor pointed to by each of the original message descriptors increments by one to account for the message descriptor duplication.

On the reading of the Appendix A, a specification for a QIO library in an intra-processor scenario, the application of these uniprocessor QIO routines to the global QIO library and the extension of the global QIO scheme to incorporate the embodiments detailed in Appendix A are readily appreciated by a routineer of the art. In particular Appendix A provides additional details on registering and deregistering a driver, getting and duplicating a message descriptor, returning a message or message descriptor, duplicating a message, and getting and putting a message from or onto a queue.

Appendix A also provides details on getting driver information, posting an event, creating and deleting a module ID, setting limits for a module, getting and putting a pool, counting the message descriptors in a queue, creating and deleting queues, attaching segments, getting IOPRM space and returning IOPRM space.

MESSAGE DESCRIPTOR OBJECTS

Another protocol involves the characterization of the message descriptors. In one embodiment, the global form of message descriptor is an object in the sense of object-oriented programming. Only predetermined functions, methods (in the C++ jargon) or interfaces (in the COM/OLE jargon) are available for manipulating the object. Limiting access to the message descriptors and to the global pointers they contain is an additional safety measure against corrupting memories across the TNet.

In one embodiment, the following functions are available to manipulate a messages or message descriptors:

return the size of the data pointed to by a message (RETURN_MESSAGE_SIZE( ));

return the size of the data pointed to by a message descriptor (RETURN_MESSAGE_DESCRIPTOR_SIZE( ));

divide a message descriptor into multiple message descriptors (DIVIDE_MESSAGE_DESCRIPTOR( ));

DIVIDE_MESSAGE_DESCRIPTOR( ) takes as arguments a message descriptor and an array or list of data buffer sizes. The routine returns an array or list of newly allocated message descriptors with the same buffer descriptor but with offsets and lengths set as specified by the data buffer sizes. The newly allocated message descriptors are the result of separate calls to DUPLICATE_MESSAGE_DESCRIPTOR( ), with the user data read pointers and lengths adjusted to meet the specifications given by the user. Thus, the original and all duplicate message descriptors have the same constituent buffer descriptor, and the reference count of the constituent buffer descriptor is affected accordingly.

For example, if md_ptr is a pointer to a message descriptor for 100 KB of data, the call DIVIDE_MESSAGE_DESCRIPTOR (md_ptr, 15, 50, 35, 0);

would return an array of three message descriptors, the first with its user read data pointer pointing to the first 15 bytes of the data, the second with its user read data pointer pointing to the next 50 bytes of the data and the third with its user data read pointer pointing to the last 35 bytes of the data buffer. The associated length fields are, of course, set correspondingly.

Because all four message descriptors point to the same data buffer, the buffer descriptor's reference count will increment by three, say, from one to four.

Finally, a CONVERT_FOR_READ( ) routine is provided which will return convert a specified message descriptor into whatever form necessary for the router, interface unit and BTE of the invoking DSS to read the actual data pointed to by the global pointer in the specified message descriptor. The data is read from the DSS of origin into the DSS that is the caller of the routine. (There may be a corresponding CONVERT_FOR_WRITE( ) routine.)

Move-on-Demand Scenario Revisited

The use of the data structures and protocols described above in the movie-on-demand scenario previously discussed is described below. When a global QIO data structure is described as moving from one DSS to another, the reader will understand that the low-level message-based communications system described above is used to communicate that data structure between DSS's, typically using PUT_MESSAGE( ).

Again, the supposition is that the application server process 531 employs the disk process 530 to retrieve the data 560 from disk and employs the intermediate and TCP/IP & ATM driver processes 532, 533 to forward the data 560 to the user interface. Again, the further supposition is that the application process 531 attaches some application-specific data 561 at the beginning of the outgoing data 560. The size of the data 560 is, say, 100 kilobytes (KB).

Each DSS participating in the data I/O by reference scheme has a global QIO library. The global I/O memory 580, the disk process SPS 510, the application server process 511, the intermediate protocol process SPS 512, the TCP/IP & ATM driver SPS 513 and the ATM controller 570 each invoke the CREATE_QUEUE( ) routine of its respective global QIO library to create inbound queues for receiving global QIO messages. The service is named, say, "DATA_I/O" on each DSS. This allows any DSS on the TNet which is participating in data I/O by reference to manipulate the QIO queues of any other DSS on the Tnet also participating in data I/O by reference.

Further, the disk process 530 invokes its global QIO library routine CREATE_QUEUE( ) to create inbound and outbound queues for receiving disk work requests. The service is named, say, "DiskWork." This allows any other process on the disk process SPS 510 and any DSS on the TNet to queue work requests directing the disk process 530 to read or write the disk attached to disk controller 540. A process or DSS which seeks to use the global QIO queues created by the disk process 530 knows the "DiskWork" name of the global QIO queue.

The application server process 531 will ultimately make a work request of the disk process 530 by queuing a disk work request onto the inbound "DiskWork" global QIO queue. The work request is for the data 560. However, the application server process 531 first decides whether itself or the disk process 530 will allocate the data buffer to receive the data 560.

On the other hand, if the application process 531 is to allocate the data buffer, the application process 531 decides (by whatever rules its programmer instilled) to place the 100 KB data 560 onto, say, the global I/O memory 580. The application process 531 then executes its PUT_MESSAGE( ) in order to queue, onto the global I/O memory 580's DATA_I/O global QIO queue, a request for the execution of the global I/O memory 580's GET_MESSAGE_DESCRIPTOR( ). The application process 531 thereby requests a global I/O memory message descriptor to a buffer of size 100 KB.

The global I/O memory 580's DATA_I/O driver executes GET_MESSAGE( ) to retrieve the application process 531's request and eventually executes GET_MESSAGE_DESCRIPTOR( ) to perform the allocation requested. In completing the application server process 531's request, the global I/O memory 580's DATA_I/O driver executes PUT_MESSAGE( ) to return the newly allocated message descriptor pointing to the 100 KB buffer. PUT_MESSAGE( ) places a copy of (the global form of) the message descriptor onto the inbound DATA_I/O global QIO queue. The application process 531 performs a GET_MESSAGE to retrieve the copy of the newly allocated message descriptor and can then incorporate the user data write global pointer to the data buffer into its work request for the data 560. This work request is transmitted to the disk process 530.

With regard to bookkeeping, a PUT_MESSAGE( ) executed across DSS's requires the invoking DSS to send (a global form of) a copy of the message to the receiving DSS and executing a RETURN_MESSAGE( ). The receiving DSS, in turn, allocates a message descriptor to receive the transmitted copy and places the message descriptor on the destination global QIO queue. In effect, the message descriptor is moved from a queue on the sending DSS to a queue on the receiving DSS. Accordingly, the reference counts for the buffer descriptors of the new message are the same as they were on the sending DSS, i.e., one.

In a similar manner, the message descriptor allocated by the GET_MESSAGE DESCRIPTOR( ) call is transferred from the global I/O memory 580 to the application server process SPS 511. The reference count of the buffer descriptor of that message descriptor is also one.

On the other hand, if the disk process 530 is to allocate the buffer, then the application process 531 can, either in the message packet type or in the work request data structure, indicate that the disk process 530 is to allocate the data buffer using its equivalent procedure. The application process 531 can direct the disk process 530 to allocate the buffer by, e.g., setting the address field for the global TNet pointer to a predetermined value, such as NULL or zero.

With a message descriptor containing the global address in hand for the destination of the data 560, the disk process 530 instructs the disk controller 40 to transfer the data 560 from disk controller 40's disk platter to the global I/O memory 580's memory 556. The transfer of the data 560 from the disk controller 540 to the global I/O memory 580 is not data I/O by reference. The data 560 is actually copied from the disk controller 540 to the global I/O memory 580, using HDAC packets as necessary. The result of the transfer is one more copy of the data 560 than had otherwise existed before. This conventional data transfer requires that the disk process 530 dereference the global pointer to produce an actual address which the disk process 530 then incorporates into its command sequence for the disk controller 540 so that the disk controller 540 can transfer the data 560 to the global I/O memory 580. This rereferencing is performed by CONVERT_FOR_WRITE( ), discussed above.

The disk controller 580 then interrupts (preferably in a message-based manner) the disk process 530 when the transfer is complete. The disk process 530 handles the interrupt and completes the request back to the application server process 531 by queuing a response back to the application server process 531's global QIO queue, including the global address to (the data buffer containing) the data 560, if necessary.

The application server process 531 now has in hand a message descriptor which contains a buffer descriptor pointing, by means of a global address, to the buffer with the data 560. The global pointer was created on the global I/O memory 580, the data 560 resides within the global I/O memory 580, but the message descriptor itself is on the application server SPS 511.

The application server 531 will have previously invoked its GET_MESSAGE_DESCRIPTOR( ) routine to create a message descriptor for its application-specific data 561 and performed such processing as necessary to fill the associated data buffer with the application-specific data 561. The application server process 531 now concatenates the data 561, 560 by chaining together two message descriptors: a message descriptor for the application-specific data 561 at the head of the chain, followed by the message descriptor for the data 560. The application-specific data message descriptor will contain the global address of the application-specific data 561.

Because a function of the application server process 531 is to prefix the application-specific data 561 to all movie clips which the process 531 retrieves from various disks at various times, the process 531 preferably does not forward the original message descriptor pointing to the data 561. (If it were to do so, it would have to retrieve a copy of the data 561 to prefix to each movie clip.) Instead, the process 531 invokes the DUPLICATE_MESSAGE_DESCRIPTOR( ) routine to duplicate the message descriptor pointing to the data 561. The reference count of that message descriptor's buffer descriptor increments by one from, say, one to two by virtue of the duplication.

The process 531 chains this duplicate message descriptor before the message descriptor for the data 560, creating a message pointing to the data 561, 560. The process 531 then executes PUT_MESSAGE( ) to pass the message of the data 561, 560 on to the intermediate protocol SPS 512. As explained above, the PUT_MESSAGE( ) routine moves the message (and its associated message descriptors and buffer descriptors, but not the data pointed to by their global reference pointers) from the application server SPS 511 to the intermediate protocol SPS 512. On the intermediate protocol SPS 512, the reference count of the buffer descriptors of the message are the same as they were on the application server, i.e., two for the application-specific data message descriptor and one for the data 560 message descriptor.

The intermediate protocol process 532 will have previously invoked its GET_MESSAGE_DESCRIPTOR( ) routine to allocate a message descriptor for its protocol data 562 and communicated with such processes as necessary to fill the associated data buffer with the data 562. The intermediate protocol process 532 concatenates the data 562, 561, 560 by chaining together three message descriptors: a copy of the message descriptor for the protocol data 562 at the head of the chain, followed by the (copy of the) message descriptor for the data 561, followed by the message descriptor for the data 560. The protocol data message descriptor contains the global address of the intermediate protocol data 562, and a duplicate message descriptor is allocated for forwarding. The intermediate protocol process then executes PUT_MESSAGE( ) to pass the message descriptor and buffer descriptors of the message of the data 562, 561, 560 (but not the data 562, 561, 560 itself) onto the TCP/IP & ATM global queue in SPS 513.

The message moves from the intermediate protocol SPS 512 to the TCP/IP & ATM SPS 513. On the SPS 13, the reference counts of the buffer descriptors for the data 562, 561, 560 are two, two and one respectively.

The TCP/IP process 533 takes the three message-descriptor message and processes it for the TCP/IP protocol. The process 533 invokes GET_MESSAGE_SIZE( ) to compute the size of the message and, say, realizes that this message must be broken into three TCP/IP packets: The first TCP/IP packet will include the intermediate protocol header data 562, the application-specific data 561 and the first portion of the movie clip data 560'. The second packet will include a second portion of the movie data 560", and the third packet will include the remainder of the movie data 560'". The process 533 prepares three TCP/IP headers 563a, 563b, 563c, thrice invoking GET_MESSAGE_DESCRIPTOR( ) to allocate message descriptors as necessary.

The process 533 also executes DIVIDE_MESSAGE_DESCRIPTOR( ) in order to divide the data 560 into the packetized data 560', 560" and 560'".

The process 533 now has six data buffers pointed to by nine message descriptors: three TCP/IP headers 563a, 563b, 563c; one intermediate header 562; one application header 561;

three data chunks 560', 560" and 560'"; and the original data 560. The data chunks 560, 560', 560" and 560'" all are the same buffer.

The TCP/IP & ATM driver process 533 now chains these message descriptors to produce the three TCP/IP packets described above, and chains the three TCP/IP packets together to produce a message with the following data sequence: the TCP/IP header 563a, the intermediate header 562, the application-specific data 561, the data 560', the TCP/IP header 563b, the data 560", the TCP/IP header 563c and the data 560'". (Note that the message descriptor for the data 560 per se does not appear in this newly created message.) The original buffer descriptor for the message descriptor for the global buffer 560 now has a reference count of five. The driver process 533 uses PUT_MESSAGE( ) to forward this eight-message descriptor message to the ATM controller 570.

The ATM controller 570 is now poised to begin data transmission of the data. The controller 570 walks the list of descriptors and transfers the actual data from each of the DSS's holding the data. For the four message descriptors of the first packet, the data sources are the TCP/IP driver SPS's memory 553, the intermediate protocol SPS's memory 552, the application server SPS's memory 552 and the global I/O memory 580. The ATM controller invokes CONVERT_FOR_READ( ) on each of the message descriptors in turn, constructing read requests across the TNet. The HDAC's are processed through the ATM controller 570's BTE DMA (not shown) as the ATM controller 570 needs the data, and the ATM controller 570's FIFO (not shown) holds the retrieved data until the ATM chip set (not shown) and protocol are ready for it.

The ATM controller 570 finishes transferring all of the data for the first ATM packet, invokes RETURN_MESSAGE_DESCRIPTORS to return the message descriptors for that first packet. (The ATM controller then so notifies the ATM driver SPS 513 by interrupt.)

The ATM driver SPS 513 returns each of the message descriptors of the first packet via RETURN_MESSAGE_DESCRIPTOR( ) global QIO calls. Return of the message descriptor pointing to the first TCP/IP header data 563a results in the message descriptor and the constituent data buffer and buffer descriptor being freed immediately within the SPS 513, since they were allocated there and the reference count of the buffer descriptor was one. (That is to say, the message descriptor was never subjected to DUPLICATE_MESSAGE_DESCRIPTOR( ), only PUT_MESSAGE( ).)

Returning the message descriptor pointing to the intermediate header data 562 to the intermediate protocol SPS 512 will reduce its buffer descriptor count to one. Therefore, that buffer descriptor cannot be freed yet. (The returned message descriptor was the result of a DUPLICATE_MESSAGE_DESCRIPTOR( ), causing the buffer descriptor's reference count to go to two.) The intermediate protocol process 532 is free to use the message descriptor pointing to the data 562 the next time the intermediate protocol is needed.

Returning the message descriptor pointing to the application-specific data 561 will likewise reduce its buffer descriptor's reference count to one. The application server process is free to use the message descriptor pointing to the data buffer 561 the next time the application-specific data is needed.

Finally, returning the message descriptor pointing to the first fragment of the disk data 560' to the global I/O memory 580 results in reducing the reference count of the buffer descriptor for the disk data 560, 560', 560" by one to four.

The transmission of the data in the message descriptors of the second packet and the return of those message descriptors are analogous to the first packet. A detailed description is therefore omitted in order to avoid repetition.

Finally, the ATM controller 570 finishes transferring all of the data for the third and last ATM packet. It invokes PUT_MESSAGE( ) to return the message descriptors for that third packet and (interrupts the ATM driver SPS 513). The ATM driver process 533 processes the return of each of the message descriptors. Differences between the return processing for the first packet include this last packet are first, that the reference count for the data 560 has been reduced to one.

Returning the message descriptor pointing to the disk data 560 involves returning the message descriptor to the global I/O memory 580, the original allocator of the buffer for its current use. The reference count of the buffer descriptor for the data 560 falls by one to zero. The message descriptor and its constituent buffer descriptor and data buffer are all deallocated, returning to their respective free pools. If the data 560 is to be used again in the future, it must be pulled from the disk controller 540 again.

As a person of skill in the art will appreciate, in a system where several processors were serially involved in transferring data from the disk controller 570 to the ATM controller, and where three of the processors 511, 512, 513 added to the data to be forwarded to the ATM controller 570, only one transfer of each piece of data actually occurred—from the respective sources (the global I/O memory 580, the SPS's 511, 512, 513) of the data (560, 561, 562, 563) to the ultimate destination (ATM controller 570) of the data.

Thus is disclosed an apparatus and method for performing data I/O by reference among multiple data sources and sinks. The method is particularly useful in video-on-demand and multi-media applications. The advantages of data I/O by reference include better parallelism, better linear expendability, high speed networking and the ability to use specialized function-specific processors.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

What is claimed is:

1. In a data processing system having a distributed memory architecture that includes a plurality of data source/sinks (DSSs) having associated memories, coupled as nodes to a network and with data accessible by memory address over the network, a method comprising the steps of:

creating a first descriptor to first data on a first of said plurality of DSSs;

transferring said first descriptor onto a second of said plurality of DSSs without transferring the first data; and transferring said first descriptor from said second DSS onto a third of said plurality of DSSs, wherein the number of times said first data is transferred to said second DSS is less than the number of times said first descriptor is transferred from said second DSS.

2. The method of claim 1, further comprising the steps of:

creating on said second DSS, a second descriptor to second data; and chaining said first and second descriptors to form a first chained descriptor.

3. The method of claim 1 further comprising the step of:

transferring said first chained descriptor to one of said plurality of DSSs.

4. The method of claim 1, further comprising the step of:

retrieving a portion of the first data from said first DSS to said third DSS by means of said first descriptor.

5. The method of claim 1 wherein one of said steps of transferring comprises duplicating said first descriptor, thereby creating a duplicate descriptor and incrementing a counter to said first data; and transferring one of said descriptor and said duplicate descriptor onto said second DSS.

6. The method of claim 1 wherein the number of times said first data is transferred to said second DSS is zero.

7. The method of claim 6 further comprising the steps of:

destroying said duplicate descriptor; and decrementing said counter.

8. In a data processing system having a distributed memory architecture that includes a plurality of data source/sinks (DSS) having associated memories, coupled as nodes to a network and with data accessible by memory address over the network, a method comprising the steps of:

creating a descriptor to data on a first of said plurality of DSSs;

transferring said descriptor onto a second of said plurality of DSSs without transferring the data;

dividing said descriptor into a plurality of descriptors, each of said plurality of descriptors describing a portion of the data;

transferring one of said plurality of descriptors from said second DSS onto a third of said plurality of DSSs without transferring the portion of the data described by said one descriptor.

9. The method of claim 8 wherein said one of said steps of transferring comprises duplicating said descriptor, thereby creating a duplicate descriptor and incrementing a counter to said first data: and transferring one of said descriptor and said duplicate descriptor onto said second DSS.

10. The method of claim 9 further comprising the steps of:

destroying said duplicate descriptor: and decrementing said counter.

11. The method of claim 8 further comprising the step of retrieving the portion of the data described by said one descriptor from said first DSS to said third DSS.

12. The method of claim 8 further comprising the step of chaining before each of said plurality of descriptors a respective descriptor to data.

13. The method of claim 12 wherein each said respective descriptor data comprises a protocol header.

14. A medium for data storage wherein is located a computer program for performing data I/O among a plurality of data source/sinks (DSSs) by creating a descriptor to data on a first of said plurality of DSSs;

transferring said descriptor onto a second of said plurality of DSSs without transferring the data;

dividing said descriptor into a plurality of descriptors, each of said plurality of descriptors describing a portion of the data;

transferring one of said plurality of descriptors from said second DSS onto a third of said plurality of DSSs; and retrieving the portion of the data described by said one descriptor from said first DSS to said third DSS.

15. A medium for data storage where is located a computer program for performing data I/O in a data processing system having a distributed memory architecture that includes a plurality of data source/sinks (DSSS) having associated memories, coupled as nodes to a network and with data accessible by memory address over the network, by creating a first descriptor to first data on a first of said plurality of DSSs;

transferring said first descriptor onto a second of said plurality of DSSs without transferring the first data; and transferring said first descriptor from said second DSS onto a third of said plurality of DSSs, wherein the number of times said first data is transferred to said second DSS is less than the number of times said first descriptor is transferred from said second DSS.

16. The medium for data storage of claim 15 wherein said computer program further retrieves a portion of the first data from said DSS to said third DSS by means of said first descriptor.

17. In a data processing system having a distributed memory architecture that includes a plurality of data source/sinks (DSSs) having associated memories, coupled as nodes to a network and with data accessible by memory address over the network, a method comprising the steps of receiving on a first of said plurality of DSSs a descriptor to data, said data not resident on said first DSS, said descriptor including an address valid on the network for said data; and forwarding said descriptor to a second of said plurality of DSSs with said address unchanged, said data not resident on said second DSS.

18. A medium for data storage where is located a computer program for performing data I/O in a data processing system having a distributed memory architecture that includes a plurality of data source/sinks (DSSs) having associated memories, coupled as nodes to a network and with data accessible by memory address over the network, by receiving on a first of said plurality of DSSs a descriptor to data, said data not resident on said first DSS, said descriptor including an address valid on the network for said data; and forwarding said descriptor to a second of said plurality of DSSs with said address unchanged, said data not resident on said second DSS.

* * * * *